(12) United States Patent
Andrew et al.

(10) Patent No.: US 7,155,729 B1
(45) Date of Patent: Dec. 26, 2006

(54) METHOD AND SYSTEM FOR DISPLAYING TRANSIENT NOTIFICATIONS

(75) Inventors: Felix G. T. I. Andrew, Seattle, WA (US); J. Andrew Goossen, Issaquah, WA (US); Ian M. Ellison-Taylor, Seattle, WA (US); David A. Sobeski, Redmond, WA (US); Cecil J. Juanarena, Bellevue, WA (US); Joseph H. Matthews, Woodinville, WA (US); Suzan M. Andrew, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 09/705,858

(22) Filed: Nov. 3, 2000

Related U.S. Application Data

(60) Provisional application No. 60/192,691, filed on Mar. 28, 2000.

(51) Int. Cl.
*G06F 9/46* (2006.01)
(52) U.S. Cl. .................... 719/318; 715/700; 715/768
(58) Field of Classification Search ............... 709/318; 719/318; 715/700, 768
See application file for complete search history.

(56) References Cited

U.S. PATENT DOCUMENTS

| | | | | |
|---|---|---|---|---|
| 5,768,119 A | * | 6/1998 | Havekost et al. ............. 700/4 |
| 5,896,131 A | * | 4/1999 | Alexander ................. 345/634 |
| 5,950,211 A | * | 9/1999 | Shealy ....................... 707/204 |
| 5,959,621 A | * | 9/1999 | Nawaz et al. ............... 715/733 |
| 6,091,415 A | * | 7/2000 | Chang et al. ............... 345/809 |
| 6,144,942 A | * | 11/2000 | Ruckdashel .................... 705/9 |
| 6,169,534 B1 | * | 1/2001 | Raffel et al. ................ 345/581 |
| 6,317,128 B1 | * | 11/2001 | Harrison et al. ............ 345/629 |
| 6,405,204 B1 | * | 6/2002 | Baker et al. ................ 707/100 |
| 6,412,021 B1 | * | 6/2002 | Nguyen et al. ............. 709/318 |
| 6,424,357 B1 | * | 7/2002 | Frulla et al. ................ 345/728 |
| 6,496,872 B1 | * | 12/2002 | Katz et al. .................. 709/318 |
| 6,501,739 B1 | * | 12/2002 | Cohen ........................ 370/260 |
| 6,507,351 B1 | * | 1/2003 | Bixler ........................ 715/810 |
| 6,542,868 B1 | * | 4/2003 | Badt et al. .................. 704/270 |
| 6,857,017 B1 | * | 2/2005 | Faour et al. ................ 709/224 |
| 2002/0035649 A1 | * | 3/2002 | Korn et al. ................ 709/318 |

\* cited by examiner

*Primary Examiner*—William Thomson
*Assistant Examiner*—Li Zhen
(74) *Attorney, Agent, or Firm*—Merchant & Gould

(57) ABSTRACT

A notification component that is shared between all applications that provides notifications to users without interrupting the task that the user is working and allows users to manage the notifications from one location. The user can globally set preferences as to how the notifications should be rendered. These preferences include enabling or disabling notification classifications, which rendering type they want to use for each notification classification, and priority of notifications within each notification classification. The notification component allows the user to indicate what notifications the user want to sees and how the notifications are rendered. Rendering types include audio, visual, and pager styles. An application uses an application programming interface to send notification using schema based or text based notifications. The system parses the notification and provides the user the notification through notification classifications in accordance with the user preferences.

29 Claims, 5 Drawing Sheets

METHOD AND SYSTEM FOR DISPLAYING TRANSIENT NOTIFICATIONS

RELATED APPLICATIONS

This application claims the benefit of U.S. Provisional Application No. 60/192,691, filed Mar. 28, 2000.

TECHNICAL FIELD

This invention relates generally to networked communications and, more particularly, to a system and method to provide notifications to a user of the networked communications.

BACKGROUND OF THE INVENTION

Continued advances in computer processor technology have led to not only increased performance, but also increased performance expectations by the users of such computer equipment. The industry has responded to these expectations by creating applications and operating systems that take full advantage of these performance enhancements. However, as additional functionality was added, these applications generally became more complex. This increased complexity, in turn, increased the amount of help and error information needed by a user. In response, developers added additional error messages, dialog boxes, and other windows (messages/windows) in an effort to help the user, to notify the user that an error has occurred, and to notify the user that more information is needed.

Unfortunately, this has resulted in a continually increasing number of messages being generated from applications and the operating system. Additionally, the number of important and trivial messages sent from other users located remotely on the network is increasing rapidly. The most prevalent notification mechanisms for these messages in windows based operating systems are dialog boxes, message boxes, and icons (e.g., tray notify icons) on the operating system's status bar.

Dialog boxes, error messages, message boxes and other notification windows form all of these sources are invasive and often frustrate the user. These boxes may appear to the user as the top-most window and they generally capture control of the user interface. These dialog and message boxes are often accidentally dismissed by users who may be focusing on entering input and not paying attention to the computer monitor. Additionally, the dialog and message boxes often end up hidden behind other windows. The appearance of a box and the accidental dismissal of it frustrates the user because the appearance and accidental dismissal often interfere with the task the user is performing. This often causes the user to become sidetracked from his task and lose his train of thought.

Tray icon notifications, on the other hand, provide an indication on the status bar that a message has arrived. This indication is generally displayed using one of two methods. In the first method, the tray icon provides notification that a message has been received by either changing its shape, blinking, or a combination of the two. The second method places a tray icon on the status bar indicating that a message has been received. This second method then removes the tray icon when the user has seen the message. Two significant limitations of using tray icons are that they are not always obvious when they appear and the tray icon is not always easily identifiable. Another limitation is that the tray icon notification is not practicable in those operating systems that provide the user with an option to hide the status bar because the user will not see the tray icon notification. Additionally, when multiple messages are present, the tray notify icon area can become cluttered making new icons had to spot. As a result of the clutter, the user is often unaware when a new message arrives.

In response to these and other user frustrations with dialog boxes, message boxes and tray icons, application developers have developed individualized notification mechanisms for their applications in an attempt to reduce the user frustration. For example, many e-mail applications now provide some form of message indicating the receipt or presence of e-mail. When a user is logged on to MSN® Messenger Service, for example, a message window appears to inform the user whenever mail arrives. However, control of the user interface is not transferred to this message window. WorldNet® provides a tray icon that blinks when a message arrives and displays a message to indicate the number of messages that have not been read when the user places a cursor over the tray icon.

The development of independent notification mechanisms provide some advantages over prior methods of providing user notification. However, the mechanisms have resulted in inconsistent user interfaces for managing notifications and have introduced other limitations. Each application providing an independent mechanism requires additional overhead. Further, the effort of coding and debugging these individual notification mechanisms and their user interfaces has increased development time and cost of these applications. Unfortunately, users still cannot control how notifications are received and cannot disable the notifications from being received. What is needed is a notification mechanism that is shared between all applications and that provides users with more control over the notifications they receive.

SUMMARY OF THE INVENTION

In view of the above described problems existing in the art, the present invention provides a centralized notification component that may be shared between all applications. Through this centralized component users are provided the capability to manage their own notifications locally. Further, application developers no longer have to code and debug individual notification mechanisms and user interfaces thus reducing development cycle time and cost.

The instant invention provides a client-side shared notification component that lets a user continue working on a task while receiving a notification (i.e., a message). The notification component further allows the user to indicate what notifications the user want to sees and how he would like to see them, i.e. the rendering type. Rendering types include audible, visual, and pager styles. An application uses an API (Application Programming Interface) to send a notification to the notification component using schema based or text based notifications. The notification component parses the notification and provides the user the notification through notification classifications.

The notification component also allows the user to globally set preferences as to how the notifications should be rendered. These preferences include the enabling or disabling of notification classifications, the selecting of which rendering type the user wants to use for each notification classification, and the setting of priority of the notifications within each notification classification.

Additional features and advantages of the invention will be made apparent from the following detailed description of illustrative embodiments that proceeds with reference to the accompanying figures.

BRIEF DESCRIPTION OF THE DRAWINGS

The file of this patent contains at least one drawing executed in color. Copies of this patent with color drawings will be provided by the Patent and Trademark Office upon request and payment of the necessary fee. While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
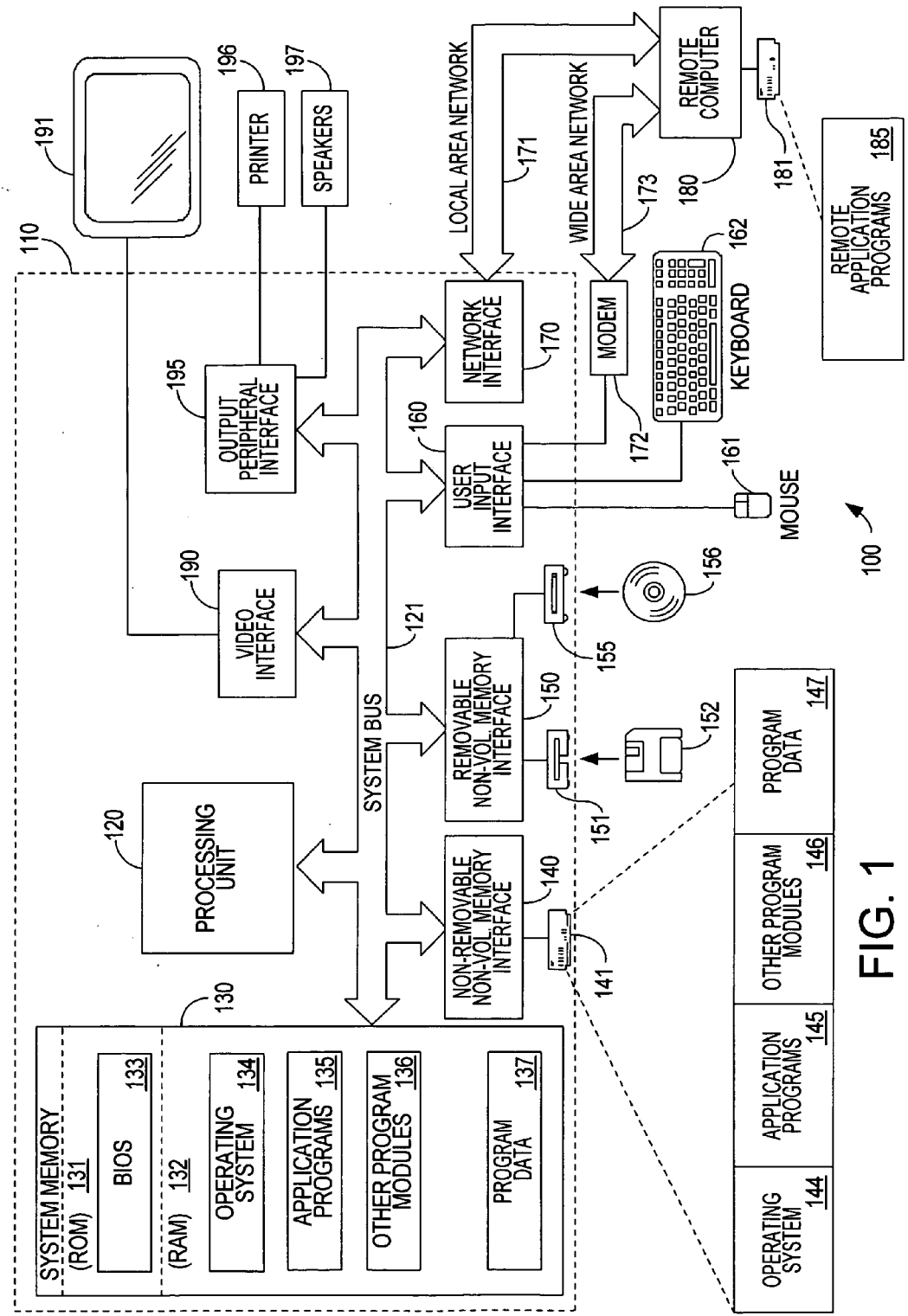
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
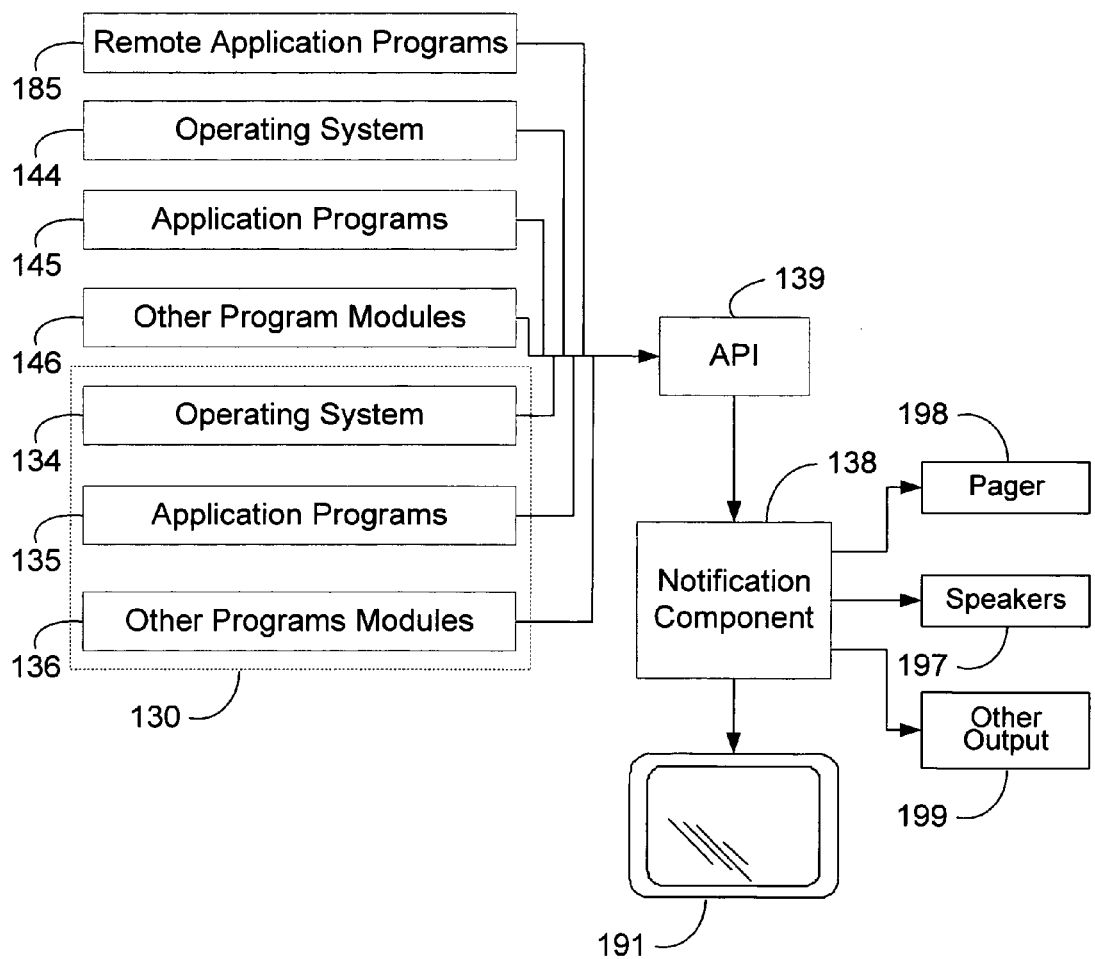
FIG. 2 is a block diagram of a notification component of the present invention in relation to components in the exemplary computer system of FIG. 1.

FIG. 2 illustrates an embodiment of the instant invention in the exemplary computer system of FIG. 1, although those skilled in the art will recognize that the functions of the invention can be implemented in other computer systems. Operating system 134, application programs 135, other program modules 136, operating system 144, application programs 145, other program modules 146, and remote application programs 185 may each send a notification to be provided to the user to notification component 138. However, for purposes of illustration and ease of understanding, the invention will be described in relation to only the notifications provided by the application programs 135. Those skilled in the art will understand that the operating system 134, other program modules 136, operating system 144, application programs 145, other program modules 146, and remote application programs 185 utilize a similar mechanism to provide their notifications as application programs 135. While FIG. 2 shows notification component 138 being separate from system memory 130, it may be implemented as part of system memory 130. For example, notification component 138 may be integrated with operating system 134.

Notification component 138 receives the notification and checks the user's preferences stored in a system registry or file to determine if the user wants to see the notification. The user's preferences may also be stored within the notification component 138. If the user's preferences indicate that the notification should be displayed, notification component 138 renders the notification according to the user's preferences via an appropriate notification medium such as monitor 191, speakers 193, pager 198, or other output 199. Other output 199 represents any mechanism that provides notification to the user such as a wireless PDA (personal digital assistant). The notification is rendered using a rendering style that does not transfer control of the input devices to the notification and that is not hidden behind other windows.

There are several types of notifications that are rendered by notification component 138. The types of notifications include mail messages, user messages, applications changing state messages, meeting reminders, stock tickers, etc. The notification component assigns each notification type a classification (i.e., a category). The list of classifications is extensible and presently includes contact, financial, e-mail, system level, and audio classifications. The contact classification is used for meeting notices, phone notifications, and any other notification that indicates that another user wants to make contact. The financial classification is used for financial based notifications, and the audio classification is used for audio notifications. The e-mail classification is used for e-mail notifications. For example, contact classification notifications are notifications such as "Conference Room 10 in 5 minutes" for a meeting notice, and "Joe at 703-308-4357" for a phone notification. An example of an e-mail notification is "Bill from Microsoft." An example of a financial classification notification is a stock ticker such as "MSFT up 5," an example of a system level notification is "Battery is low" and an example of an audio classification notification is "Playing Train."

The notification component 138 receives notifications to be rendered via an application programming interface (API) 139. In one embodiment, the application programs 135 specify the classification and the notification to be rendered in text form to the notification component 138 via the API 139. The API 139 comprises a property command that identifies the classification and a text command that provides the text of the notification. An exemplary implementation of the property command and the text command is the following:

```
CTunaclient notify;
    notify.SetProperty("classification")
    notify.SetText("message text")
``` where "classification" is the notification classification and "message text" is the text of the notification to be rendered. In this embodiment, the notification component 138 receives the notification and renders it according to the user's preferences.

In an alternative embodiment, the application programs 135 provide the notification to the notification component 138 using an XML (extensible markup language) schema. The XML schema is extensible and uses a notice classification tag and a notification type tag. The notice classification tag provides the notification component 138 with the notification classification. The notification type tag provides the notification component 138 with the notification to be rendered and the style of rendering. An exemplary implementation of the XML schema is the following:

```
<notification classification="category">
    <style text="message"/>
</notification>
``` where "category" is the notification classification, "message" is the notification to be rendered and "style" is the style of rendering. The rendering styles include visual, pager, and spoken renderings. For example, if the notification is to be rendered visually, the <style text="message"> command is <gui text="message">. For audio notifications, the command is <spoken text="message"> and for pager notifications, the command is <pager text="message">. The applications programs 135 can supply several text strings to the notification component 138. An example of a text string the application programs 135 provides is:

```
<notification>
    <gui text="Message"/>
    <pager text="You have a message"/>
    <spoken text="There is a message for you"/>
</notification>
```

The notification component 138 then decides which rendering style to use based on the user's preferences.

The notification component 138 renders the notifications in accordance with the notification classification and the user's preferences. The user preferences allow the user to enable or disable notification classifications globally, to enable or disable notifications from a particular application, to specify the rendering style for each notification classification, and to specify the priority in which notifications should be rendered. In one embodiment, users select their preferences via a dialog box.

Figure 3A:
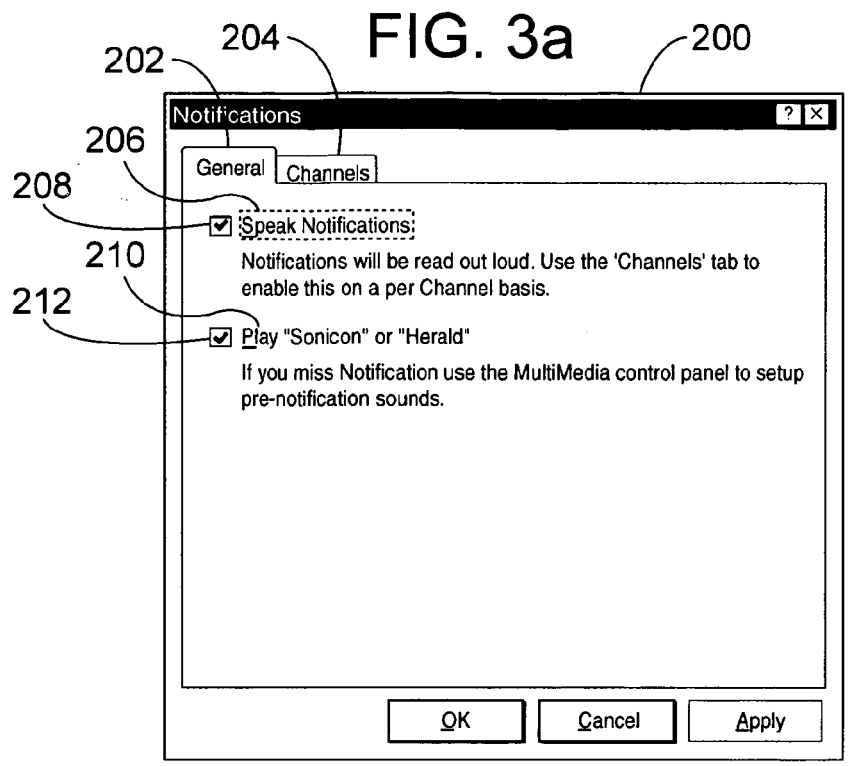
FIG. 3 is an exemplary illustration of a user preference dialog box in accordance with the teaching of the present invention.
Figure 3B:
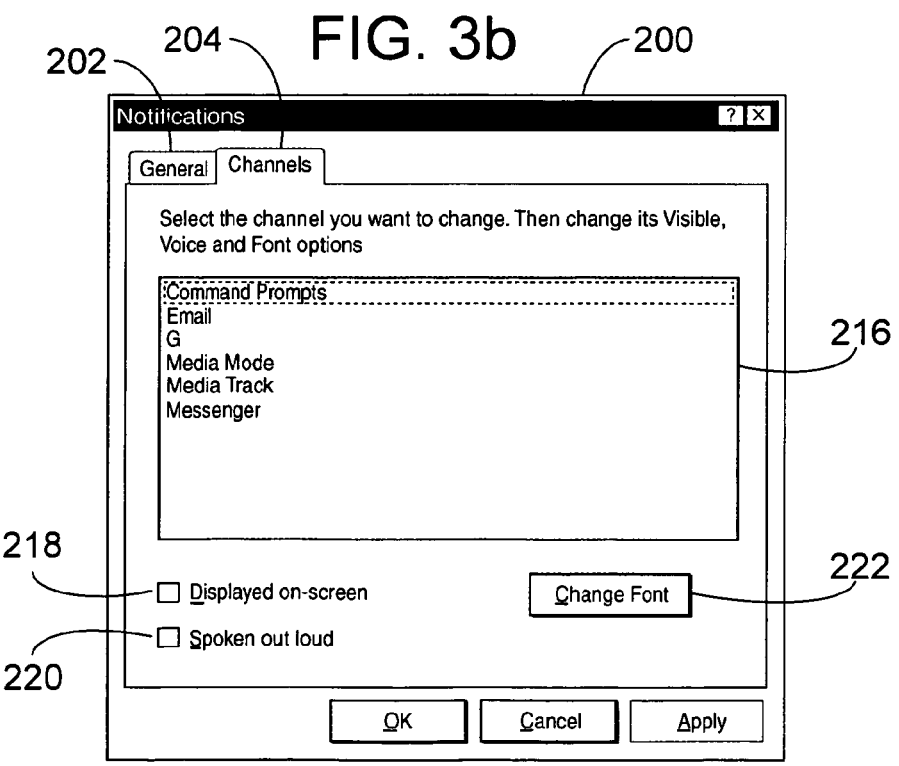

FIGS. 3a and 3b provide an example of a dialog box that is used to set user preferences. Dialog box 200 has several preference screens represented by tabs 202 and 204. The user selects tab 202 to bring up the global preferences and selects tab 204 to bring up the notification classifications. The global preferences allows the user to enable the audio rendering style by selecting the check box 208, which corresponds to the description 206. Likewise, the pre-notification notification, discussed below, can be enabled by selecting the check box 201, which corresponds to the description 212. The notification classification rendering preferences are selected from list box 216. The user selects how notifications in each notification classification are rendered by selecting check box 218 for visual rendering and by selecting check box 220 for audio rendering. The user can select the font and font size of the visual rendering style by selecting font button 222, which bring ups another dialog box (not shown) that allows the user to select font options. One skilled in the art will recognize that other tabs (not shown) are selected to bring up other preference screens. For example, in one embodiment, the functional notification classification provides the user with an option to have the notification component 138 bring up the web-site where the user's portfolio is stored when the user receives notifications that affect his portfolio.

The rendering styles that the user can select currently include audio, pager, and visual. The notification component 138 will incorporate other types of rendering mechanisms as they become viable. The user may also select a pre-notification notification with the audio rendering style. If this pre-notification notification is selected, the notification component 138 alerts the user that an audio notification is arriving. The alert allows the user to listen for the incoming notification. Without the alert, the user may misinterpret or not hear the first few words of the notification because the user is focusing on running a task. The notification component 138 renders the audio style by converting the notification text into audio and using the speakers 197. If speakers are not present, the notification component 138 renders the notification using the visual rendering style. In one embodiment, the notification component 138 is actionable (i.e., one or more actions are performed) when the user says a keyword or key-phrase in response to hearing the notification. For example, if the notification is a financial notification that is about the user's mutual fund performance and the user says the keyword or key-phrase (e.g., "show me"), then the notification component 138 performs a specified function (e.g., brings up the web-site of the user's mutual fund). The pager rendering style pages the user as known by those skilled in the art.

Figure 4:
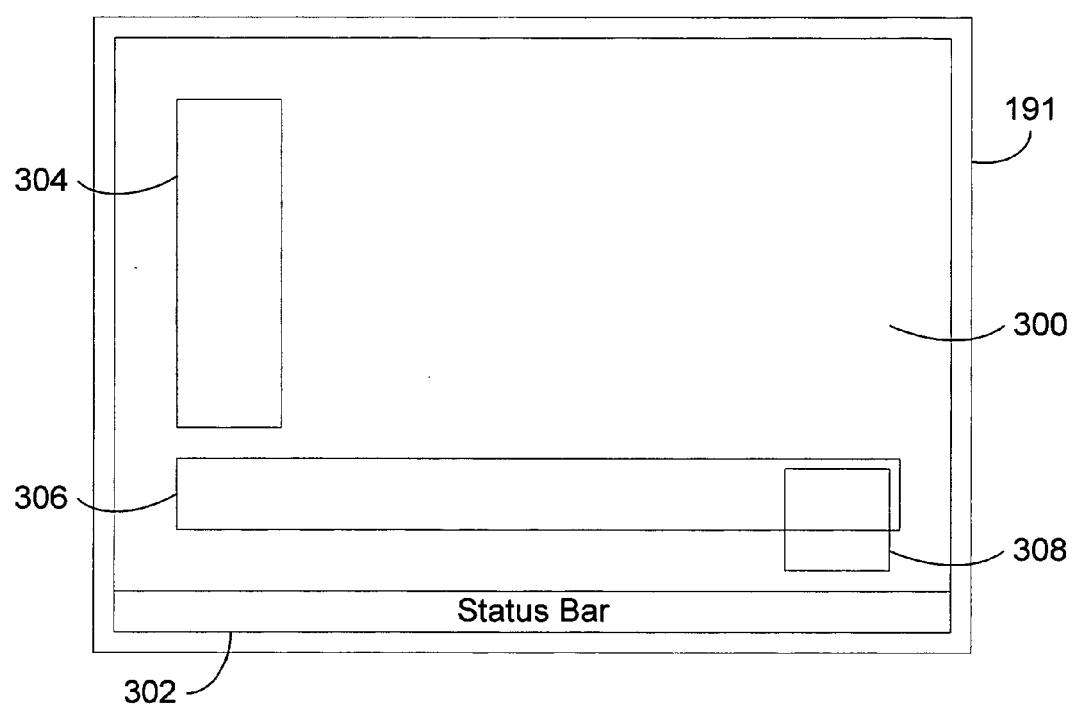
FIG. 4 is a diagram illustrating display areas in accordance with the teaching of the present invention.

The visual rendering style has several options. The notification can be rendered with a transparent display, an alpha-blended display, and a transparent alpha-blended display. The user specifies the font and font size of the notifications, the color of the notifications in the displays and where on the monitor 191 that the notification is to be rendered for each notification classification. FIG. 4 illustrates exemplary display areas 304, 306, and 308 on display 300 of monitor 191 that the user may define and use to display visual notifications. Note that the user can define any area at any position on the display 300. The status bar 302 may also be used as a display area for visual notifications. The transparent display 310 (see FIG. 5a) and alpha-blended display 312, 314 (see FIG. 5b) pop-up in the specified display area and disappear after a predetermined amount of time. In one embodiment, the transparent display 310 and alpha-blended display 312, 314 fade into view and then fade out of view after being displayed for the predetermined amount of time. The visual notification can also be rendered using a normal display (i.e., a message box display) or an animated display. Additionally, the visual notification can be actionable (i.e., a function is executed when the user clicks on the display with a user selection device such as a mouse, keyboard, joystick, etc.). For example, the web-site where the user's stock portfolio is stored can be brought up when the user clicks on notifications that are about his stock portfolio or the e-mail application can be opened or be brought to the top-most window level in response to the user clicking on an e-mail notification with a user selection device.

Figure 5A:
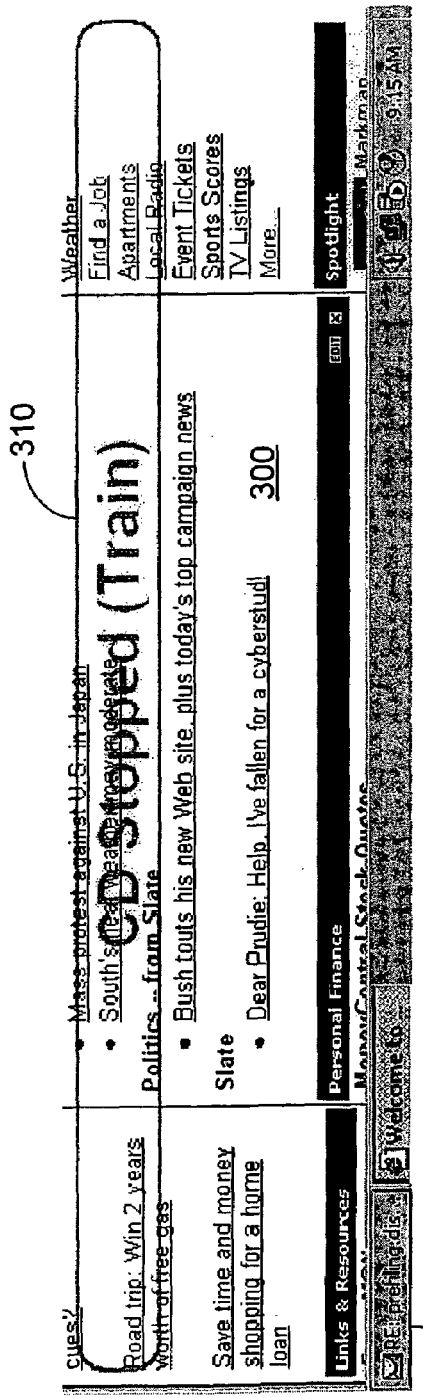
FIG. 5 shows illustrative visual rendering styles in accordance with the teaching of the present invention.
Figure 5B:
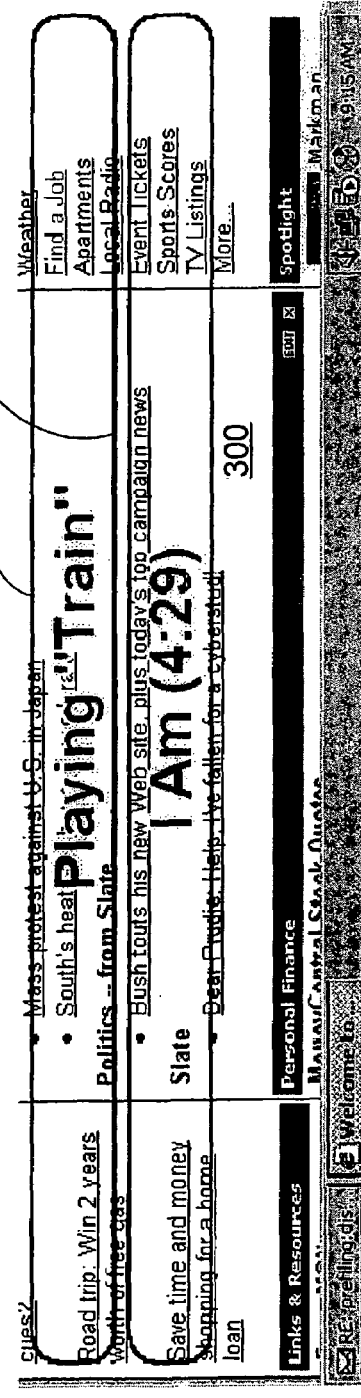

FIGS. 5a and 5b provide an example of a transparent display 310 and an alpha-blended display 312, 314 located in a portion of the display 300 rendered by the notification component 138. An alpha-blended display is a display in which the levels of opacity or transparency is selected so that the image behind the alpha-blended display is partially visible. The image behind a transparent display 310 is completely visible.

In one embodiment, the rendering styles also include a rendering version. The rendering versions include a short version and a long version. For example, a short version of a notification may be "Microsoft up 2 at 82" and a long version may be "Microsoft up 2 at 82 on increased volume." For each notification classification, the user selects whether the short version or the long version should be used in rendering the notification. The applications programs 135 provides both rendering versions in the notification sent to the notification component 138. An example of a notification providing both the short version and the long version in XML form is:

```
<notification>
    <gui text="MSFT +2 / 82 / volume up" shorttext="MSFT +2/82/up"/>
    <spoken text="Microsoft up 2 points to 82 on increased volume"
    shorttext="Microsoft up 2 at 82"/>
</notification>
```

If the applications programs 135 only provides one text string, then the notification component 138 renders the text string provided using the rendering style chosen.

The user also specifies the priority of how notifications are rendered. The priorities that are specified include which notification classifications have priority over other notification classifications and how often the notification component 138 should notify the user.

As previously indicated, the notification component 138 renders the notifications in accordance with the notification classification and the user's preferences. Once a notification is received, the notification component 138 parses the notification to determine the notification classification and the notification to be rendered. If the user's preferences indicate that the notification classification is enabled and the particular application is not disabled, the notification is rendered in accordance with the rendering style and priority specified in the user's preferences.

In some instances, a number of notifications to be rendered are present at the notification component 138. In these instances, notifications are queued by the notification component 138. There are two types of queues that the notification component 138 uses. The first type is a modified strict queue. Notifications in a strict queue are queued in the order they are received and are rendered in the same order. In the modified strict queue, the notifications are queued by priority and in the order they are received. They are then rendered in the same order (i.e., from highest priority to lowest priority in the order the notifications are received in each priority level) and may be stacked vertically in the display area. The second type of queue is a flushed queue. In the flushed queue, the queue is flushed of all messages when a new notification arrives. For example, if a compact disc player changes state or changes song, the queue is flushed of previous state changes or song changes because they are out of date.

In one embodiment, the notification component 138 has a history feature that keeps track of the notifications that have not been rendered. Notifications from the history may be flushed by the notification component 138 once they have been rendered to the user. Older notifications are also flushed from the history. The time period that the notifications are kept is selected by the user, and may be set for each notification classification. The user also may select how the notifications in the history are displayed. The history feature is also actionable (i.e., one or more actions are performed when the user selects a notification in the history).

A centralized notification system has been described that allows a user to continue working on the task at hand while receiving a notification. The system allows a user to set preferences globally and by notification classification, allows the user to enable or disable notification classifications, and allows the user to set priority levels of notifications. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium which stores a set of instructions which when executed performs a method for displaying a notification, the method executed by the set of instructions comprising:
   receiving a notification at a notification component to provide to a user, the notification component adapted to receive notifications from a plurality of objects and adapted to receive notifications of different notification types;
   determining a priority to assign the notification based on a user specified priority;
   deciding a notification type, wherein deciding the notification type comprises selecting one of a display notification and an audio notification, wherein selecting the display notification comprises selecting one of an alpha-blended display, a transient display, a transient alpha-blended display, an animated display, and a normal display; and
   rendering the notification in accordance with the priority and the notification type.

2. The computer-readable medium of claim 1 having further computer-executable instructions for performing the step of determining a notification medium to render the notification.

3. The computer-readable medium of claim 1 having further computer-executable instructions for performing the step of determining an area on a display to render the notification.

4. The computer-readable medium of claim 1 wherein the step of receiving the notification comprises the steps of:
   receiving a property of the notification; and
   receiving a notification to be sent to the user.

5. The computer-readable medium of claim 1 wherein the step of receiving the notification comprises the step of receiving an XML-cased notification, the XML-based notification comprising a notification classification tag and a notification type tag.

6. The computer-readable medium of claim 1 wherein the step of selecting the display notification comprises selecting one of an alpha-blended display and a transient display.

7. The computer-readable medium of claim 1 wherein the step of selecting the one of a display notification and an audio notification comprises the step of selecting one of one of a display notification and an audio notification and a pager notification.

8. The computer-readable medium of claim 1 having further computer-executable instructions for performing the step of queuing the notification.

9. The computer-readable medium of claim 8 wherein the step of queuing the notification comprises the step of queuing the notification in a queue, the queue arranged according to the priority of the notification.

10. The computer-readable medium of claim 8 wherein the step of queuing the notification further comprises the step of flushing a queue of prior notifications.

11. The computer-readable medium of claim 1 wherein the step of determining the priority to assign the notification comprises the step of determining a number of times the user is provided notification.

12. The computer-readable medium of claim 1 having further computer-executable instructions for performing the steps of:
   determining a notification classification of the notification;
   checking a user preference list to see if the notification classification is listed in a list of selected classifications selected by the user to indicate which notification classifications the user wants to receive; and
   wherein the step of rendering the notification comprises the step of rendering the notification if the notification classification is listed in the list of selected classifications.

13. A method of displaying a notification received from one of a plurality of objects at a notification component adapted to receive notifications from the plurality of objects and adapted to receive notifications of different notification classifications, the method comprising the steps of:
   determining, by the notification component, a notification classification;
   rendering, by the notification component, the notification in accordance with the notification classification and a user specified priority; and
   selecting a rendering type and wherein rendering the notification in accordance with the notification classification further comprises rendering the notification using the rendering type wherein selecting the rendering type comprises selecting one of an alpha-blended display, a transient display, a transient alpha-blended display, an animated display, and a normal display.

14. The method of claim 13 further comprising the step of determining a notification medium and wherein the step of rendering the notification in accordance with the notification classification comprises the step of rendering the notification in the notification medium in accordance with the notification classification.

15. The method of claim 13 wherein the step of rendering the notification in accordance with the notification classification further comprises the step of rendering the notification in accordance with a user preference.

16. The method of claim 15 wherein the user preference comprises a classification enable, a positional location, and a classification size, the positional location being a location on a display where the notification is to be displayed, the classification size being an area in a display area where the notification is to be displayed, the step of rendering the notification in accordance with a user preference comprises the steps of:
   determining if the classification enable is enabled for the notification classification; and
   if the classification enable is enabled for the notification classification, rendering the notification at the positional location and at a size equal to the classification size.

17. The method of claim 13 wherein the step of determining a notification classification comprises the step of selecting one of a contact classification and an audio classification.

18. The method of claim 17 wherein the step of selecting one of a contact classification and an audio classification comprises the step of selecting one of a contact classification, a financial classification, and an audio classification.

19. The method of claim 17 wherein if the step of selecting one of the contact classification and the audio classification comprises the step of selecting the audio classification, the step of rendering the notification further comprises the step of sending a pre-notification notification to a user prior to performing the step of rendering the notification.

20. The method of claim 17 wherein the notification comprises a text message and if the step of selecting one of the contact classification and the audio classification comprises selecting the audio classification, the step of rendering the notification further comprises the step of converting the text message into an audio message prior to performing the step of rendering the notification.

21. The method of claim 13 wherein the step of selecting the rendering type comprises selecting one of an alpha blending display and a transparent display.

22. The method of claim 13 furthering comprising the step of updating a history of notifications.

23. The method of claim 22 wherein the step of updating a history comprises the steps of:
 flushing read items from the history that have been read by a user; and
 flushing old items from the history, the old items determined from the user preference.

24. The method of claim 23 further comprising the step of displaying items in the history in accordance with the user preference.

25. The method of claim 22 further comprising the steps of:
 displaying the history; and
 performing at least one action if a notification in the history is selected by a user selection device.

26. The method of claim 13 further comprising the step of performing at least one action if the notification is selected by a user selection device.

27. The method of claim 13 further comprising the step of:
 if the notification classification is an audio notification classification, performing at least one action if one of a keyword and a key-phrase is spoken by a user.

28. The method of claim 13 wherein the step of rendering the notification further comprises the step of rendering the notification in one of a long version and a short version, the short version being an abbreviated version of the long version.

29. A method of displaying a notification received from one of a plurality of objects at a notification component adapted to receive notifications from the plurality of objects and adapted to receive notifications of different notification classifications, the method comprising:
 determining, by the notification component, a notification classification; and
 rendering, by the notification component, the notification in accordance with the notification classification and a user specified priority, wherein rendering the notification in accordance with the notification classification further comprises rendering the notification in accordance with a user preference, wherein the user preference comprises a classification enable, a positional location, and a classification size, the positional location being a location on a display where the notification is to be displayed, the classification size being an area in a display area where the notification is to be displayed, rendering the notification in accordance with a user preference comprises,
 determining if the classification enable is enabled for the notification classification, and
 if the classification enable is enabled for the notification classification, rendering the notification at the positional location and at a size equal to the classification size.

* * * * *